United States Patent [19]

Yagi et al.

[11] Patent Number: 4,656,046

[45] Date of Patent: Apr. 7, 1987

[54] PROCESS FOR PREPARING MILK PROTEIN RESISTANT TO ACIDS AND BASES

[75] Inventors: Naoki Yagi, Suita; Kwang Y. Kim, Osaka; Tarushige Nakaji, Yao, all of Japan

[73] Assignee: Minaminihon Rakuno Kyodo Kabushiki Kaisha, Miyazaki, Japan

[21] Appl. No.: 769,871

[22] Filed: Aug. 27, 1985

[30] Foreign Application Priority Data

Apr. 1, 1985 [JP] Japan .................. 60-069625

[51] Int. Cl.$^4$ ............................................. A23J 3/02
[52] U.S. Cl. .................................. 426/657; 530/360
[58] Field of Search ................. 426/657, 802; 530/360

[56] References Cited

U.S. PATENT DOCUMENTS

| | | | |
|---|---|---|---|
| 3,627,536 | 12/1971 | Arima et al. | 426/802 X |
| 3,645,746 | 2/1972 | Akinson | 426/802 X |
| 3,865,959 | 2/1975 | Lecluse | 426/802 X |
| 3,962,481 | 6/1976 | Kumar | 426/802 X |

Primary Examiner—Robert Yoncoskie
Attorney, Agent, or Firm—Wegner & Bretschneider

[57] ABSTRACT

A process for preparing a milk protein resistent to acids and bases which comprises subjecting an aqueous solution or dispersion containing casein and 0.5-30 parts of an acidic polysaccharide per 100 parts of casein at pH of 7.3-10.5 and at a temperature of 70° C. or higher for 3 minutes or more. When the heat treatment is carried out in the presence of calcium or magnesium ion in an amount of up to 1.4 parts by weight per 100 parts of casein, thickening activity of the milk protein is further improved.

5 Claims, No Drawings

PROCESS FOR PREPARING MILK PROTEIN RESISTANT TO ACIDS AND BASES

FIELD OF THE INVENTION

The present invention relates to a process for preparing a milk protein which is resistant to acids and bases and is useful as a raw material of food and a food additive.

BACKGROUND OF THE INVENTION

Casein which is a main component of a milk protein exhibits excellent emulsifying and thickening activities in a system within a neutral pH range or a system containing no salt or containing a salt in a low concentration and, therefore, it is widely employed as a raw material or an additive for food of such systems. However, casein aggregates and precipitates at a pH range of not more than about 4.6 which is the isoelectric point thereof. Further, casein also aggregates in the presence of a large amount of a salt such as sodium chloride, etc. and salting-out of casein occurs. Accordingly, in a system within an acidic pH range or containing a large amount of a salt, excellent properties and functions of casein are spoiled and it is very difficult to use casein in food of an acidic pH range or food containing a large amount of a salt.

Under these circumstances, the present inventors have intensively studied in order to obtain a processed casein which can exhibit sufficient emulsifying and thickening activities without salting-out even in the presence of a large amount of a salt, and excellent emulsifying activity without aggregation even in an acidic system. As the result, the present inventors have found that, by subjecting casein and an acidic polysaccharide to a heat treatment under certain conditions, it is possible to obtain casein which is resistant to both acids and bases and can exhibit excellent properties and functions thereof even in food of an acidic pH range or food containing a large amount of a salt as well as in food within a neutral pH range or food containing no salt or a small amount of salt.

OBJECTS AND SUMMARY OF THE INVENTION

The main object of the present invention is to provide a casein which is resistant to both acids and bases.

This object as well as other objects and advantages of the present invention will become apparent to those skilled in the art from the following description.

According to the present invention, there is provided a process for preparing a milk protein resistant to acids and bases which comprises subjecting an aqueous solution or dispersion containing casein and 0.5–30 parts by weight (the term "parts" hereinafter means "parts by weight") of an acidic polysaccharide per 100 parts of casein to a heat treatment at pH 7.3 to 10.5 and at a temperature of not less than 70° C. for 3 minutes or more. In the process of the present invention, thickening activity of the resulting milk protein can be further improved by carrying out the heat treatment in the presence of calcium ion or magnesium ion.

DETAILED DESCRIPTION OF THE INVENTION

In order to carry out the process of the present invention, at first, an aqueous solution or dispersion of casein and an acidic polysaccharide is prepared.

Casein used includes casein or sodium caseinate. Casein is used by dissolving it with an alkali such as sodium hydroxide, potassium hydroxide, aqueous ammonia, sodium carbonate, sodium triphosphate, potassium carbonate, calcium hydroxide, magnesium hydroxide, etc. In case of using an alkali such as calcium hydroxide or magnesium hydroxide which is a calcium or magnesium ion source, as described hereinafter, the amount thereof should be 1.4 parts per 100 parts of casein or less in view of improvement of thickening activity. Sodium caseinate is used by dissolving it in warm water. The amount of casein used is 3% (% hereinafter means wt %) or more based on the entire aqueous solution or dispersion to be prepared, generally, 3–30% is preferred.

The acidic polysaccharide includes alginic acid, sodium alginate, alginic acid propylene ester, carrageenin (any one of $\kappa$, $\lambda$ and $\iota$), furcellaran, gum karaya, gum ghatti, gum tragacanth, xanthan gum, methyl cellulose, carboxy methyl cellulose, low-methoxyl pectin, etc. It can be used alone or in a combination thereof. The acidic polysaccharide is used in the ratio of 0.5–30 parts per 100 parts of casein. When this ratio of the acidic polysaccharide to casein is either too small or too large, any desired resistance to acids and bases is not expected.

The aqueous solution or dispersion can be prepared by dissolving or dispersing casein and an acidic polysaccharide simultaneously or successively in warm water or an aqueous solution of the above alkali according to a conventional manner. Alternatively, it can be prepared by separately dissolving or dispersing casein and an acidc polysaccharide in advance and then mixing them.

Then, the aqueous solution or dispersion thus obtained is heated at pH 7.3–10.5 and at a temperature of 70° C. or higher for 3 minutes or more.

When an aqueous alkaline solution is employed to dissolve casein, adjustment of pH of the solution or dispersion is not always required. However, when adjustment of pH is required, it is carried out with the above alkali.

Although there is no intention to limit to a particular theory, it is understood that, by the heat treatment of the present invention, casein and the acidic polysaccharide forms a complex and, thereby, the desired resistance to acids and bases is provided. In order to form a desired complex, pH of the heat treatment must be, as described above, in the range from 7.3 to 10.5. It is considered that formation of the desired complex is insufficient when the heat treatment is carried out at pH of lower than 7.3, and the complex becomes unstable due to break of disulfide bond when the heat treatment is carried out at pH of higher than 10.5. Therefore, it is necessary to carry out the heat treatment at this pH range and at a temperature of 70° C. or higher for 3 minutes or more. The upper limit of the heating temperature and the heating time are not limited to specific degrees unless they have any adverse effect on the resulting product. In general, however, the heat treatment is preferably carried out at 70°–130° C. for up to 90 minutes in view of operation and economical efficiency.

In the present invention, when the heat treatment is carried out in the presence of calcium ion or magnesium ion, thickening activity of casein is further improved. For this purpose, it is preferable to add a calcium ion source or a magnesium ion source prior to or during the heat treatment. As the calcium or magnesium ion source, there can be used calcium chloride, calcium phosphate, calcium carbonate, calcium sulfate, calcium lactate, calicum hydroxide, magnesium chloride, magnesium sulfate, magnesium citrate, magnesium lactate, etc. The calcium or magnesium ion source can be used in a ratio of 0.1 to 1.4 parts per 100 parts of casein calculated as calcium or magnesium ion. When this ratio is too much, thickening activity is rather spoiled.

After cooling, the solution or dispersion thus treated per se can be directly used as a milk protein resistant to acids and bases of the present invention. Alternatively, it can be further subjected to additional processes such as concentration, drying, etc. according to a conventional manner.

The milk protein obtained by the process of the present invention can be used as a raw material or an additive in acidic food because it is resistant to acids. For example, it can be used as an emulsifier for sour cream, dressing, etc. Further, since the milk protein obtained by the process of the present invention can produce high viscosity in the presence of calcium ion or magnesium ion without salting-out even under a high concentration of sodium chloride, it can be used as a raw material or an additive in food containing a large amount of a salt. For example, it can be used as a thickening agent for a sauce or an emulsifyer or gelling agent for ham and sausage which contain sodium chloride in such a high concentration as 3 to 5%. In addition, it is possible to develop a new food product by utilizing the novel properties of the milk protein of the present invention.

The following examples further illustrate the present invention in detail but are not to be construed to limit the scope thereof.

EXAMPLE 1

5 kg of ι-Carrageenin was added and dissolved in 350 liters of warm water to which was added 100 kg of casein. 72 Liters of 1N aqueous sodium hydroxide was added to the resulting mixture to dissolve casein. The pH of the solution was 8.1. The solution was maintained ar 80° C. for 30 minutes, and then it was spray-dried to give 93 kg of the desired milk protein powder.

According to a conventional method, a cream of the following formulation was produced by using the resulting milk protein powder.

| Ingredient | Amount |
|---|---|
| Lard | 350 g |
| The above-obtained milk protein powder | 50 g |
| Starch syrup powder | 100 g |
| Water | 650 g |
| Homogenizer pressure | 150 kg/cm$^2$ |

10 ml of the cream was added to 100 ml of 10% aqueous solution of sodium chloride. After dispersion, it was distributed into tubes. Each tube was heated to 90° C. and aggregation of lard was estimated. However, any aggregation of lard was not observed. Any denaturation of the protein due to sodium chloride was not observed either. Further, when the heated dispersion was diluted 50 times with water and the emulsion was subjected to microscopic observation, no aggregation of fat sphere was observed and uniform dispersion of fat spheres having diameter of 1-3 microns was observed.

EXAMPLE 2

1 g of Xanthan gum was dissolved in warm water 900 ml to which were added 100 g of sodium caseinate and 2 g of sodium tripolyphasphate to effect solution. The pH was 7.5. The resulting solution was heated to 75° C. and maintained at this temperature for 5 minutes. Then, the solution was cooled to room temperature to obtain the desired milk protein solution.

According to conventional method, a sour cream of the following formulation was produced by using the resulting solution.

| Ingredient | Amount |
|---|---|
| Milk protein solution | 600 g |
| Butter oil | 800 g |
| Lactose | 100 g |
| Water | 480 g |
| Polyglycerin fatty acid ester | 20 g |
| Yeast extract | 0,5 g |

After pre-homogenizing the mixture of these ingredinets, the mixture was pasteurized at 80° C. for 5 minutes, homogenized at 50 kg/cm$^2$ and then placed in a sterilized closed container. After cooling, 1% of a starter of lactic acid bacteria (*Lactobacillus bulgaricus*) was added and the mixture was subjected to lactic acid fermentation at 37° C. for 10 hours. When the fermentation mixture was reached to pH 4.5, fermentation was ceased by heating to 80° C. and the mixture was homogenized at 45 kg/cm$^2$ and cooled to below 10° C. The sour cream thus obtained was pH 4.4 and no aggregation of protein was observed. It was in a good emulsified state and showed excellent form retention.

EXAMPLE 3

0.3 g of Xanthan gum and 1.7 g of α-carrageenin was added to 370 ml of warm water and the resulting mixture was heated at 80° C. to effect solution, after which 2.0 g of calcium chloride dihydrate was added and dissolved. 100 g of Casein was dispersed in the solution and to which 30 ml of 10% aqueous sodium hydroxide was added to dissolve casein. The pH of the solution was 7.6. The solution was heated at 80° C. for 30 minutes. Then, the solution was divided into two equal portions and sodium chloride was dissolved in one portion in such an amount that the concentration thereof became 5%. Each portion of the solution was cooled to 5° C. and gel strength thereof was measured by using a rheometer. Further, the same procedure was repeated except that calcium chloride was not added and gel strength of each portion was measured. In addition, as a contraol, the same procedure was repeated by using a sodium caseinate solution of the same concentration. The results are shown in Table 1.

TABLE 1

| | Gel strength (g/cm$^2$) | |
|---|---|---|
| Milk protein solution | with NaCl | without NaCl |
| Present invention (+CaCl$_2$) | 680 | 189 |
| Present invention (without CaCl$_2$) | 218 | 121 |
| Control | 60 | 70 |

As is seen form Table 1, the milk protein solution of the present invention shows a high gel strength even in the presence of sodium chloride. Particularly, when calcium ion is present, a higher gel strength is obtained.

EXAMPLE 4

To 900 ml of warm water was added 3 g of sodium alginate and further added 30 g of sodium caseinate to effect solution. 5 g of Sodium tripolyphasphate was added to this solution and reacted by heating at 90° C. for 5 minutes to obtain the desired milk protein solution. The pH thereof was 8.1.

A coffee whitener was produced by adding 240 g of coconut oil (melting point: 32° C.), 330 g of Pinedex (starch hydrolysate) and then 10 g of polyglycerin fatty acid ester to the milk protein solution thus obtained and homogenizing the mixture at 150 kg/cm². The coffee whitener was added to coffee (pH 5.0) in such a ratio that 15 ml thereof was contained per 250 ml of coffee and the mixture was filled in cans. The cans were sterilized by autoclaving at 121° C. for 30 minutes. Next morning, the cans were opened and the contents thereof were tested. As the result, the coffee whitener was uniformly dispersed in coffee and no aggregation of protein and separation of oil were observed.

REFERENCE EXAMPLE 1

The same procedure as in Example 1 was repeated except that the amount of i-carrageenin was decreased to 0.2 kg or the heat treatment was carried out at pH 7.0 to obatin a respective milk protein powder. According to the same procedure as in Example 1, a cream was produced by using each milk protein powder thus obtained. When each cream obtained was added to 10% aqueous sodium chloride solution and heated, fat was aggregated at 40° C. and the cream was separated into an aqueous layer and an oil layer by further elevation of the temperature. In addition, when the emulsion without heating was subjected to microscopic observation, aggregation of fat spheres was observed.

REFERENCE EXAMPLE 2

The same procedure as in Example 2 was repeated except that the amount of xanthan gum was decreased to 0.3 g, the heat treatment was carried out at pH 7.0 or the heat treatment was carried out at 65° C. to obtain a respective milk protein solution.

According to the same procedure as in Example 2, the production of a sour cream was tried by using each milk protein solution thus obtained. However, it was very difficult to obtain a cream-like state due to aggregation of protein.

The results of the tests for the relations between heat treatment conditions and resistance to acids and bases are illustrated hereinafter.

Test 1

Effect of addition of acidic polysaccharide 300 ml Portions of warm water were placed in six 1 liter beakers (A-F). To each beakers was added 0 g, 0.4 g, 0.5 g, 5 g, 30 g or 31 g of carrageenin, respectively and the mixture was heated at 80° C. to effect solution. 100 g of Casein was added to each beaker, dispersed and then dissolved by addition of 80 ml of 1N aqueous sodium hydroxide. Each solution thus obtained was heated to 80° C. and maintained at this temperature for 15 minutes after which each solution was immediately cooled to 50° C. By using a sample of each solution, the following tests for resistance to acids and bases were carried out.

Test 1-A

Test for resistance to acids 10 g Sample of each solution was dissolved in 90 ml of warm water and pH thereof was lowered to 5.0 by addition of 1% solution of acetic acid. The solution was autoclaved at 121° C. for 1 minute. Then, it was centrifuged at 1000 r.p.m. for 5 minutes and the volume of precipitate formed (ml/50 ml) was measured. Separately, 1% solution of acetic acid was added to the autoclaved solution until the volume of precipitate formed by centrifugation under the same conditions became 1.0 ml/50 ml and the pH of the resulting mixture was measured.

Test 1-B

Test for resistance to bases

By using each sample, a cream of the following formulation was produced according to a conventional manner.

| Ingredient | Amount |
|---|---|
| Sample | 200 g |
| Lard | 180 g |
| Starch syrup powder | 150 g |
| Water | 470 ml |
| Homogenization at 70° C. under | 200 kg/cm² |

Homogenization at 70° C. under 200 kg/cm² 15 ml. Portions of the cream thus produced were dispersed in 100 ml portions of 3% and 10% sodium chloride solutions, respectively and allowed to stand overnight. Aggregation of the cream was estimated with the naked eye according to the following criteria.

++: Complete aggregation, separation into upper and lower layers
+: aggregation observed
±: slight aggregation observed
−: no aggregation The results of Tests 1-A and 1-B are shown in Table 2.

TABLE 2

| Sample | Carrageenin parts per 100 parts casein | Test 1-A ml/50 ml | Test 1-A pH at 1 ml/50 ml | Test 1-B NaCl 3% | Test 1-B NaCl 10% |
|---|---|---|---|---|---|
| A | 0 | 1.5 | 4.8 | + | ++ |
| B | 0.4 | 0.8 | 4.5 | ± | + |
| C | 0.5 | 0.2 | 4.2 | − | ± |
| D | 5 | 0.1 | 3.5 | − | − |
| E | 30 | 0.5 | 4.3 | − | ± |
| F | 31 | 1.0 | 4.7 | + | + |

As is seen from Table 2, when the acidc polysaccharide is used in an amount of 0.5 to 30 parts per 200 parts of casein, the milk protein having resistance to acids and bases is obtained.

Test 2

Effect of pH

4 Liters of warm water was placed in a 10 liter container, 50 g of carrageenin was added thereto and the mixture was heated at 80° C. to effect solution. Then, 1 kg of sodium caseinate was added and stirred to obtain a solution at 60° C. The solution was divided into equal six portions and pH of each portion was adjusted to 6.8, 7.2, 7.3, 8.2, 10.5 or 10.6 respectively with sodium hydroxide. Each solution was maintained at 80° C. for 15 minutes and then cooled to 60° C. Each solution was subjected to the same test procedure in Tests 1-A and 1-B to estimate its resistance to acids and bases. The results are shown in Table 3.

TABLE 3

| pH | Resistance to acids ml/50 ml | Resistance to acids pH at 1 ml/50 ml | Resistance to bases NaCl 3% | Resistance to bases NaCl 10% |
|---|---|---|---|---|
| 6.8 | 1.0 | 5.0 | + | ++ |
| 7.2 | 0.7 | 4.5 | ± | + |

TABLE 3-continued

| | Resistance to acids | | Resistance to bases | |
|---|---|---|---|---|
| pH | ml/50 ml | pH at 1 ml/50 ml | NaCl 3% | NaCl 10% |
| 7.3 | 0.2 | 4.4 | — | — |
| 8.2 | 0.1 | 3.5 | — | — |
| 10.5 | 0.6 | 4.4 | — | ± |
| 10.6 | 1.4 | 4.8 | + | ++ |

As is seen from Table 3, when the heat treatment is carried out at pH of 7.3–10.5, resistance to acids and bases is provided.

Test 3

Effect of heating temperature and time

According to the same procedure as in Test 2, a carrageenin solution was prepared and casin was dissolved therein. At that time, the temperature of the solution was maintained at not more than 65° C. After adjusting pH to 8.0 with sodium hydroxide, each solution was heated at 68° C., 70° C., 80° C., 90° C. or 120° C. for 2 minutes, 3 minutes, 30 minutes or 60 minutes, respectively (in case of 90° C. and 120° C., the heating time was corresponding to that after reached to the temperature). Each solutin was subjected to the above tests for resistance to acids and bases. The results are shown in Tables 4 and 5.

TABLE 4

| | Resistance to acids (ml/50 ml) | | | |
|---|---|---|---|---|
| | Heating Time (min) | | | |
| Heating Temp. (°C.) | 2 | 3 | 30 | 60 |
| 68 | 1.3 | 0.8 | 0.7 | 0.7 |
| 70 | 1.2 | 0.4 | 0.2 | 0.1 |
| 80 | 1.0 | 0.2 | 0.1 | 0.05 |
| 90 | 0.6* | 0.2 | 0.05 | 0.05 |
| 120 | 0.2* | 0.1 | 0.05 | 0.05 |

*In case of 90° C. and 120° C., the heat treatment at 70° C. for more than 3 minutes has been already effected during elevation of the temperature.

TABLE 5

| | Resistance to bases | | | | | | | |
|---|---|---|---|---|---|---|---|---|
| | Heating Time (min) | | | | | | | |
| Heating Temp. (°C.) | 2 | | 3 | | 30 | | 60 | |
| | NaCl 3% | NaCl 10% | NaCl 3% | NaCl 10% | NaCl 3% | NaCl 10% | NaCl 3% | NaCl 10% |
| 68 | + | ++ | + | ++ | + | ++ | + | ++ |
| 70 | + | ++ | — | ± | — | — | — | — |
| 80 | ± | ± | — | — | — | — | — | — |
| 90 | —* | ± | — | — | — | — | — | — |
| 120 | —* | —* | — | — | — | — | — | — |

*In case of 90° C. and 120° C., the heat treatment at 70° C. for more than 3 minutes has been effected during elevation of temperature.

As is seen from Tables 4 and 5, resistance to acids and bases is provided by the heat treatment at least at 70° C. for 3 minutes.

Test 4

Effect of calcium ion

A solution (pH 8.0) composed of 10 kg of casein, 0.5 kg of carrageenin, 40 kg of warm water and 0.33 kg of sodium hydroxide were divided into equal seven portions. Calcium chloride was added to each protion of the solution in such an amount that 0, 0.35, 0.37, 2.5, 5.1, 5.2 or 8.0% by weight based on that of casein, respectively. Each solution was heated at 80° C. for 15 minutes and then immediately cooled. The cooled solution was appropriately diluted and spray-dried. 100 g of Each powder thus obtained was dissolved in 400 ml of warm water or 5% aqueous solution of sodium chloride and distributed ito 50 ml beakers. They were cooled to 5° C. The gel strength thereof was measured by using a rheometer (using 10 samples for each solution; measured at 5° C.; using plunger having 10 mm diameter; rate of 5 cm/min.). The gel strength was corresponding to the stress when the plunger reached to 1 cm depth. The results are shown in Table 6.

TABLE 6

| CaCl₂.2H₂O | | Gel strength (g/cm²) | |
|---|---|---|---|
| % | Parts per 100 parts casein** | Warm water | 5% NaCl |
| 0 | — | 125 | 225 |
| 0.35 | | 127 | 230 |
| 0.37 | 0.1 | 171 | 318 |
| 2.5 | | 191 | 764 |
| 5.1 | | 183 | 325 |
| 5.2 | 1.4 | 115 | 240 |
| 8.0 | | 91 | 121 |
| Control* | | 70 | 60 |

*Sodium caseinate solution
**Calculated as calcium ion

As is seen from Table 6, when calcium ion is added in an amount up to 1.4 parts by weight per 100 parts of casein, thickening activity is improved.

What is claimed is:

1. A process for preparing a milk protein resistant to acids and bases which comprises subjecting an aqueous solution or dispersion containing casein and 0.5–30 parts by weight of an acidic polysaccharide per 100 parts of casein to a heat treatment at pH of 7.3–10.5 and at a temperature of 70° C.–130° C. for at least 3 minutes.

2. A process according to claim 1, wherein the acidic polysaccharides are selected from the group consisting of alginic acid, sodium alginate, propylene alginate, carrageenin, furcellaran, gum karaya, gum ghatti, gum tragacanth, xanthan gum, methyl cellulose, carboxy methyl cellulose and low-methoxyl pectin.

3. A process according to claim 1, wherein the the heat treatmenr is carried out in the presence of 0.1–1.4 parts by weight of calcium ion or magnesium ion per 100 parts by weight of casein.

4. A process according to claim 3, wherein the heat treatment is carried out in the presence of a compound as the calcium or magnesium ion source selected from the group consisting of calcium chloride, calcium phosphate, calcium carbonate, calcium sulfate, calcium lactate, calcium hydroxide, magnesium chlrodie, magnesium sulfate, mangesium citrate and magnesium lactate.

5. A process according to claim 1, wherein the heat treatment is carried out for up to 90 minutes.

* * * * *